INVENTOR.
FRANK A. HESTER
BY Alfred W. Barber
ATTORNEY

Sept. 2, 1952 F. A. HESTER 2,609,442

RECORDER AMPLIFIER WITH GROUNDED POSITIVE AND BALANCED INPUT CIRCUIT

Filed Dec. 29, 1948 2 SHEETS—SHEET 2

INVENTOR.
FRANK A. HESTER
BY Alfred W. Barber
ATTORNEY

Patented Sept. 2, 1952 2,609,442

UNITED STATES PATENT OFFICE 2,609,442

RECORDER AMPLIFIER WITH GROUNDED POSITIVE AND BALANCED INPUT CIRCUIT

Frank A. Hester, New York, N. Y., assignor to Faximile, Inc., New York, N. Y., a corporation of Delaware Application December 29, 1948, Serial No. 67,793

1 Claim. (Cl. 178—6.6)

This invention relates to facsimile recorder amplifiers or the like and more particularly to recorder amplifiers having a grounded positive supply voltage and a balanced input circuit.

In the art of facsimile, graphic and textual materials to be reproduced by facsimile methods are scanned by a small spot of light and signals representing density variations of the subject copy are generated in a photoelectric cell. These signals are amplified and transmitted to a reproducing point over a wire line or through a radio frequency link. At the receiving or reproducing end of the system the signals representing the facsimile copy density variations are amplified, rectified and applied to a suitable recorder. One common form of recorder utilizes an electrolytically sensitive recording sheet and the facsimile signals are applied to the sheet in the form of current variations representing the desired density variations to be reproduced. With no incoming signal, no current is passed through the recording sheet which corresponds to white in the record. When maximum signal is received, the maximum available current is passed through the recording sheet to produce a full black mark. Thus, in passing from white to full black the recording system must supply a current which varies from zero to a maximum in the order of 250 milliamperes. In a thermionic amplifier of average characteristics this large variation in output current causes considerable fluctuation in power supply voltage, and will generally cause the hum modulation present in the power supply to vary likewise. Hum or ripple voltage present in the output circuit feeding the facsimile recorder, as well as the variations in voltage due to the variation in load current, may cause undesirable patterns to appear in the recorded copy. While complicated and cumbersome regulated power supplies may be utilized to overcome the difficulty caused by hum and poor regulation in the power supply this is a relatively expensive and otherwise unsatisfactory answer to the problem.

According to the present invention, the major part of hum and ripple voltage in the power supply may be overcome by a balanced input circuit to the voltage amplifier of the facsimile recorder. Without this balanced input circuit the hum and ripple voltages are particularly troublesome in a facsimile system, since it is generally required that the positive side of the power supply be at ground potential. The balanced input circuit of the present invention allows the grounding of the positive side of the power supply and largely overcomes the difficulty encountered due to hum and ripple voltage over the recording current range of the recorder.

One object of the present invention is to provide a method of, and means for, reducing hum and ripple voltage effects derived from the power supply in a facsimile receiver and the like.

Another object is to provide a balanced input circuit to a facsimile amplifier permitting the grounding of the positive side of the plate voltage supply without introducing a new ripple and hum effect.

Still another object of the present invention is to provide a balanced input circuit to a voltage amplifier in a facsimile receiver which reduces hum and ripple effects in the recorded copy so that such a system is equivalent to one utilizing an expensive regulated power supply.

These and other objects of the present invention will be apparent from the detailed description of the invention given in connection with the various figures of the drawing.

Figure 1:
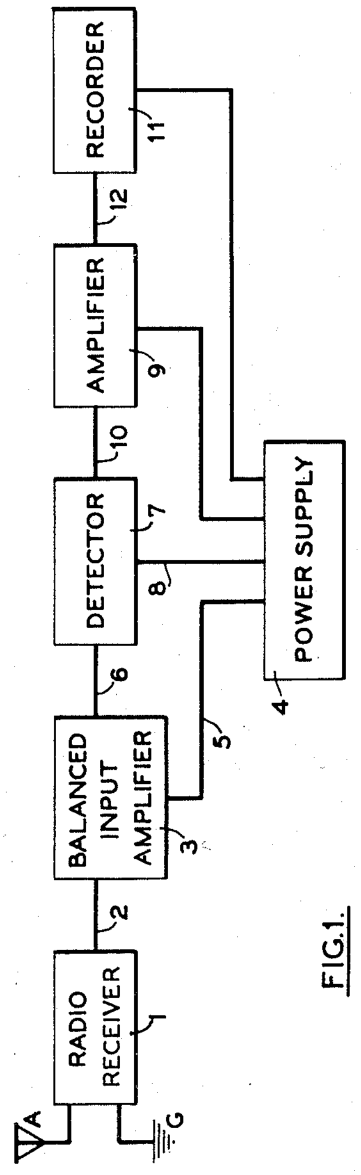
Fig. 1 shows a facsimile receiver according to the present invention entirely in block diagram.

Fig. 1 shows a radio receiver 1 which may be of any conventional type suitable for the receiving of facsimile modulated carrier waves. Receiver 1 connected to antenna A and ground G supplies a facsimile subcarrier signal to balanced input amplifier 3 over line 2. The amplified subcarrier signals are applied to detector 7 over line 6 where they are demodulated providing a pulsating D. C. facsimile signal which is applied to amplifier 9 over line 10. The amplified D. C. facsimile signals are then applied to recorder 11 over line 12. A power supply 4 supplies power for amplifier 3, detector 7, amplifier 9, and recorder 11 as will be shown in more details below. It will be noticed that the balanced input amplifier 3, which is the first voltage amplifier following the radio receiver 1 and is hence the most sensitive to hum and ripple noise from the power supply. Power supply 4 supplies amplifier 3 over line 5 in such a manner that the hum and ripple voltages present in the power supply are essentially balanced out in the amplifier as will be described in detail below.

Figure 2:
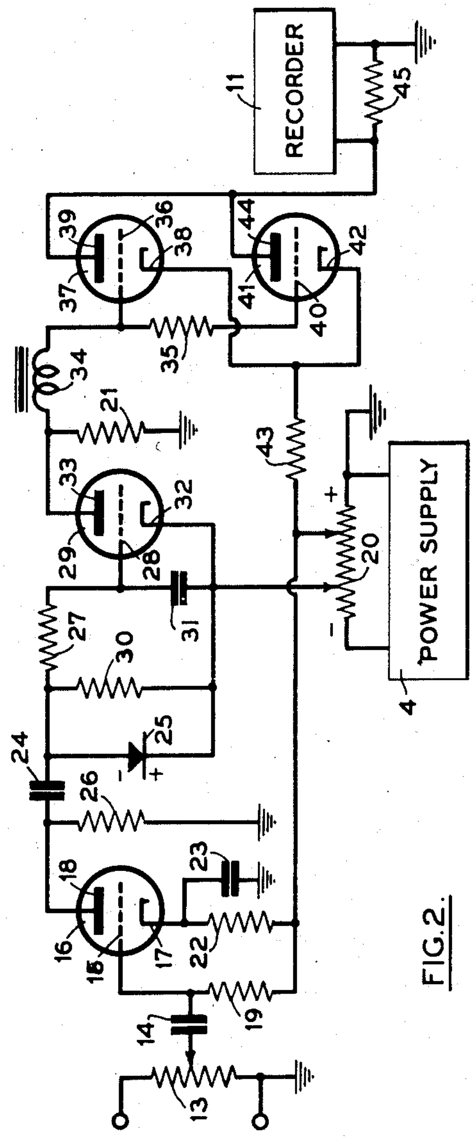
Fig. 2 shows a schematic circuit of the essential parts of the receiver including the circuits of the present invention.

Fig. 2 shows a schematic diagram of a circuit embodying the essential elements of one form of the present invention. Incoming subcarrier signals from a radio receiver or other convenient source are applied across resistor 13 and a portion of these signals is applied to a coupling capacitor 14 to grid 15 of the subcarrier amplifier tube 16. Signal current flowing from plate 18 through load resistor 26 develops an output voltage which is applied through coupling capacitor 24 to rectifier 25. Rectified signals consisting of pulsating D. C. facsimile signals appear across load resistor 30 and are applied through a filter consisting of resistor 27 and capacitor 31 to grid 28 of the direct current amplifier tube 29. The amplified D. C. signals flowing from plate 33 through load resistor 21 are applied through a compensating choke 34 to grids 36 and 40 of output D. C. amplifier tubes 37 and 41. An oscillation suppression resistor 35 may be connected between grids 36 and 40 as shown. Output current from plates 39 and 44 are applied to recorder 11 shunted by resistor 45 which may be taken to represent any conventional facsimile recorder or the like, requiring variable D. C. voltages for its operation. Cathodes 17, 32, 38 and 42 are heated by conventional means not shown. Plate and bias voltages are supplied by a suitable power supply 4 which has its positive side grounded and feeding through a voltage divider resistor 20. A suitable bias for tubes 37 and 41 is supplied from a tap on voltage divider 20 through resistor 43 and is of such value that in the absence of incoming signals the currents flowing from plates 39 and 44 through recorder 11 are essentially zero, thereby providing white copy. It will be noted that the polarity of rectifier 25 is such that a negative voltage resulting from rectification of subcarrier signals is applied to grid 28 and since the tube reverses the polarity, positive voltage of amplified magnitude is applied to grids 36 and 40. Thus, in the presence of facsimile signals, increasing currents are fed through recorder 11, the maximum signals providing the maximum current. It will be seen that a heavy drain is placed upon power supply 4 for the maximum received signal, and a relatively light drain in the absence of signal. This variation in load will cause the hum and ripple in the output voltage of power supply 4 to vary over a considerable range depending on its inherent regulation and filtering. In order to prevent the hum and ripple voltage from power supply 4 from getting into the input of tube 16, that is, on grid 15, grid 15 is connected to a power supply tap on voltage divider 20 at the same point that resistor 22 from cathode 17 is connected. Cathode 17 is bypassed to ground by means of capacitor 23. Resistors 19 and 22, and capacitors 14 and 23, form a bridge circuit which effectively prevents hum and ripple from power supply 4 from getting into the input of tube 16.

Figure 3:
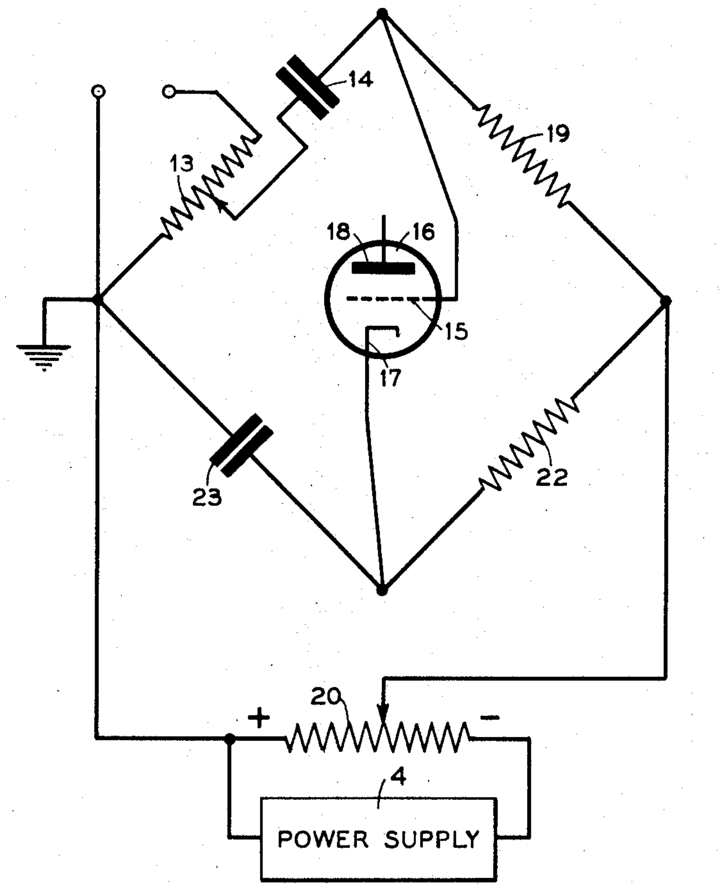
Fig. 3 shows a portion of Fig. 2 redrawn to point out more particularly the method of its operation.

This bridge circuit may be more clearly understood by referring to Fig. 3 where the elements forming it have been redrawn.

Fig. 3 shows input tube 16 including grid 15, cathode 17 and plate 18, together with resistors 19 and 22 and capacitors 14 and 23 and input resistor 13, all corresponding to the similarly designated parts of Fig. 2. Since the positive side of power supply 4 is grounded and plate 18 (as shown in Fig. 2) returns to ground, negative voltage must be applied to cathode 17 to obtain proper operating conditions for tube 16. This negative voltage is derived from a tap on voltage divider 20 connected across power supply 4. Resistor 19 from grid 15 and resistor 22 from cathode 17 return to this tap on voltage divider 20. Capacitor 23 is connected from cathode 17 to ground and capacitor 14 is connected from grid 15 to the tap on input resistor 13. In this bridge circuit, if the tap on resistor 13 were at the ground end a perfect balance would be obtained, provided that resistor 19 were to resistor 22, as the impedance of capacitor 14 is to the impedance of capacitor 23. Moving the tap along resistor 13 to apply input to tube 16 slightly upsets this ideal balance, and for its compensation, resistor 19 may be made slightly larger than the value just given. As a typical example, the circuit elements may have the following values:

| | |
|---|---|
| Resistor 22 | 1,000 ohms |
| Resistor 19 | 270,000 ohms |
| Resistor 13 | 250,000 ohms |
| Capacitor 14 | 100 micromicrofarads |
| Capacitor 23 | 20,000 micromicrofarads |

While these constants do not give a perfect balance for all settings of the tap on resistor 13, still a very large reduction in hum and ripple on power supply 4 is obtained on the input to the tube 16. In a practical case this reduction is great enough to make a conventional and ordinary power supply equivalent to a well regulated power supply for the purpose of driving a facsimile recorder circuit as described in connection with Fig. 2.

While only one embodiment of the present invention has been shown and described, many modifications will be apparent to those skilled in the art within the spirit and scope of the invention as set forth in the appended claim.

What is claimed is:

In a facsimile recording system of the type wherein recording current is passed through an electrolytic recording medium, the density of the resulting mark depending on the amount of current, and wherein the positive recording electrode is at ground potential; a recording amplifier receptive to a facsimile signal in the form of an amplitude-modulated subcarrier, and connected to the recording electrodes, comprising in combination: a common grounded-positive power supply, a balanced input amplifier circuit including a vacuum tube having at least a cathode, a control grid, and an anode, an input resistor connected at one end to ground and at the other end through a coupling capacitor to said control grid, a capacitor connected between said cathode and ground, and resistors connected from the negative side of the power supply to said cathode and to said control grid, said capacitors and resistors forming a substantially balanced bridge circuit, whereby power supply variations do not appear between said cathode and grid; a detector receptive to the output of said input amplifier circuit; and a direct-current amplifier receptive to the output of said detector, the output of said direct-current amplifier being connected to the recording electrodes; whereby variations in power supply voltage resulting from the marking current drawn by said direct-current amplifier are not fed back into the input circuit of the recorder amplifier.

FRANK A. HESTER.

REFERENCES CITED

The following references are of record in the file of this patent:

UNITED STATES PATENTS

| Number | Name | Date |
|---|---|---|
| 2,137,278 | George | Nov. 22, 1938 |
| 2,219,928 | Kalmus | Oct. 29, 1940 |
| 2,237,950 | Pineo | Apr. 8, 1941 |
| 2,258,871 | Wedig | Oct. 14, 1941 |
| 2,283,415 | Cox | May 19, 1942 |
| 2,480,418 | Paradise | May 4, 1944 |

OTHER REFERENCES

"R. C. A. Receiving Tube Manual," Series R. C.-14, page 207, 1940.